Dec. 20, 1955     F. O. LUENBERGER     2,727,795
THRUST BEARING STRUCTURE
Filed March 31, 1953     2 Sheets-Sheet 1
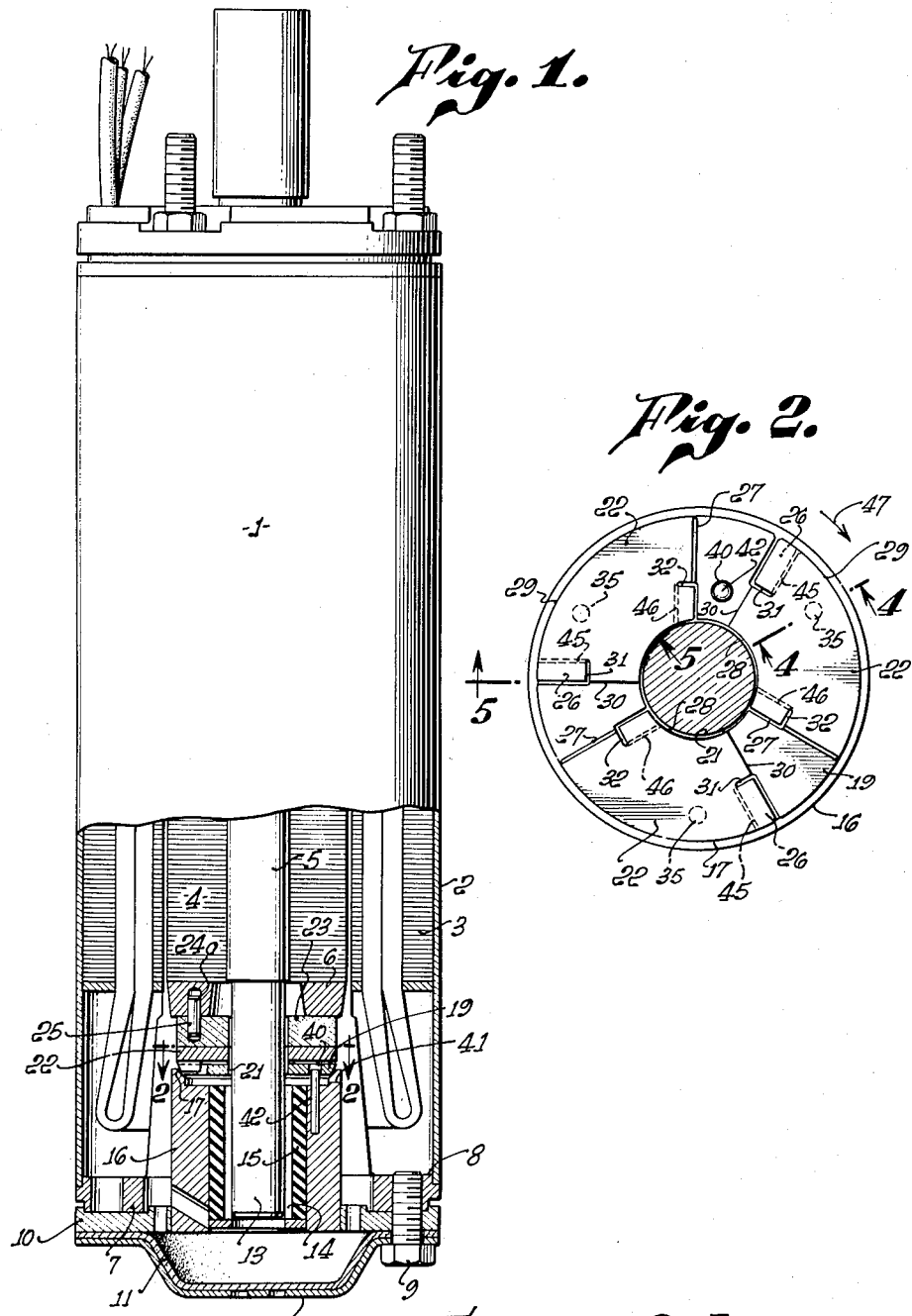
FREDERICK O. LUENBERGER,
INVENTOR.
BY John Flam
ATTORNEY.

Dec. 20, 1955 F. O. LUENBERGER 2,727,795
THRUST BEARING STRUCTURE
Filed March 31, 1953 2 Sheets-Sheet 2

FREDERICK O. LUENBERGER,
INVENTOR.

BY John Flam
ATTORNEY.

2,727,795

THRUST BEARING STRUCTURE

Frederick O. Luenberger, Los Angeles, Calif., assignor to U. S. Electrical Motors, Inc., Los Angeles, Calif., a corporation of California Application March 31, 1953, Serial No. 345,905

3 Claims. (Cl. 308—160)

This invention relates to thrust bearings for vertical shafts, and particularly to bearings of the Kingsbury type.

In this type of bearing, an upper bearing plate, rotatable in unison with the shaft, rests on a plurality of angularly arranged shoes. The shoes are arranged to tilt slightly with respect to a bearing base. As the shaft rotates, the shoes tilt in such direction as to receive a lubricating liquid between the shoes and the plate.

It is one of the objects of this invention to improve in general bearings of this character.

It is another object of this invention to make it possible to reduce the number of operating parts of the bearing structure, thereby reducing the cost of construction.

It is still another object of this invention to facilitate the manufacture of the parts, as by forming the shoes and base plate by a stamping or forging operation.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the inventon; but it is to be understood that this detailed description is not to be taken in a limiting sense, since the scope of this invention is best defined by the appended claims.

Referring to the drawings:

Figure 1 is a view, partly in section, of an electric motor incorporating a thrust bearing that embodies the invention;

Fig. 2 is an enlarged sectional view taken along a plane corresponding to line 2—2 of Fig. 1;

Figure 3:
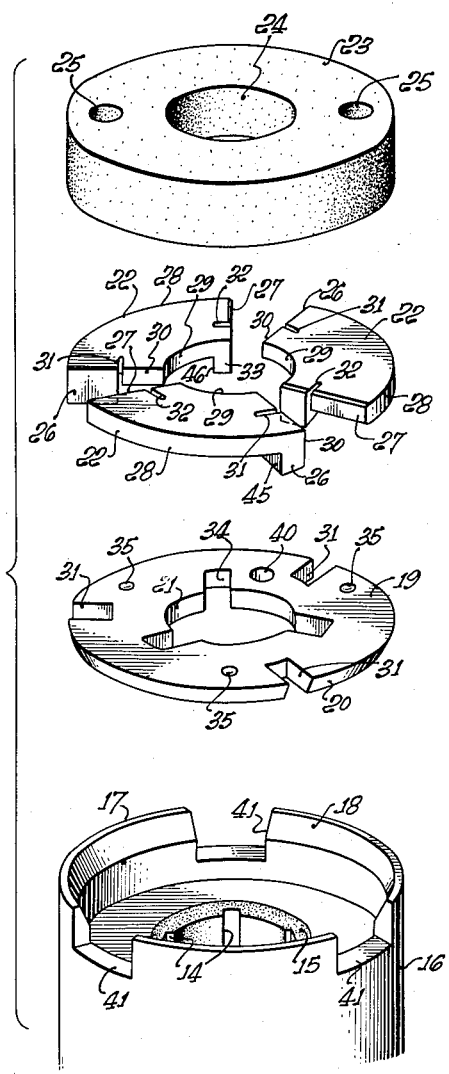
Figure 4:
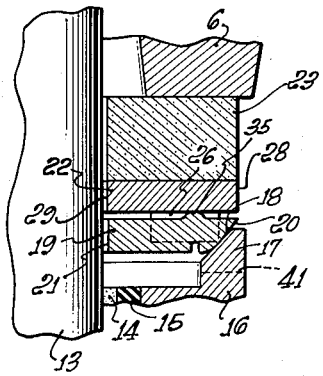
Figure 5:
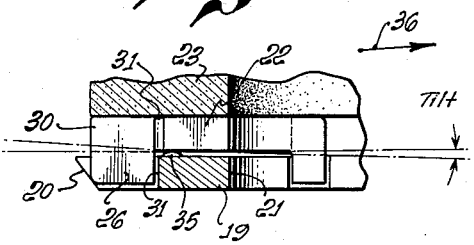

Fig. 3 is an enlarged exploded pictorial view, illustrating the elements of the thrust bearing structure; and Figs. 4 and 5 are enlarged sectional views taken along planes corresponding to lines 4—4 and 5—5 respectively of Fig. 2.

In the present instance, the thrust bearing structure is shown in connection with an electric motor 1, having a casing 2. Within the casing 2 is a stator structure 3, and a rotor structure 4. The rotor structure 4 is mounted upon a shaft 5 by any appropriate means. The rotor structure is of the squirrel cage type, having an end ring 6.

In the present instance, the electric motor may be sealed and filled with lubricating oil or other liquid, the shaft 5 being arranged in vertical relationship.

An end bracket 7 (Fig. 1) has a cylindrical portion 8 telescoping within the lower end of the casing 2. Attached to this bracket, as by the cap screws 9, is a cover member 10. This cover member carries a flexible cup-shaped sealing diaphragm 11 of flexible material which in turn is covered by an apertured metal plate 12. In this way, a fluid-tight seal at the lower end of the casing 2 is provided.

The shaft 5 has a reduced extension 13 which is journalled in a graphite sleeve 15. This sleeve is held firmly in a bracket member 16. This bracket member 16 is attached to the cover member 10 in any appropriate manner. A plurality of grooves 14 is provided in sleeve 15 for lubrication purposes.

At its upper end the bracket member 16 is provided with an interrupted flange 17. (Figs. 3, 4 and 5.) The inner surface 18 of this flange may be conical or spherical, serving as a seat for a base member 19. This base member 19 has a spherical peripheral surface 20 adapted to engage the tapered surface 18 of flange 17. It is also provided with a central aperture 21 through which the shaft extension 13 passes. The spaces 41 (Fig. 3) between the flange portions permit ready entry of lubricant between the surfaces 18 and 20.

Relative rotation between the base member 19 and the bracket 16 is restrained by the aid of a pin 42 (Fig. 1) firmly fixed into the bracket member 16, and entering into an aperture 40 in base member 19.

The base member 19 serves to support a plurality of non-rotary angularly arranged shoes 22. These shoes have upper plane surfaces adapted to contact with and support the lower surface of a bearing plate 23. When these shoes are grouped around the shaft 5, as shown in Fig. 2, they form an almost complete annular surface. However, there is sufficient clearance between adjacent edges of the shoes to permit some freedom of independent movement for each shoe.

Bearing plate 23 has a central aperture 24 through which passes the shaft extension 13. A plurality of dowel pins 24a (Fig. 1) serves to insure that this bearing plate 23 will rotate with the shaft 5. These dowel pins 24a enter into the recesses 25 of the plate 23, as well as into appropriate recesses in the end ring 6.

In order to provide an appropriate smooth bearing surface, this bearing plate 23 may be made of a mixture of crystalline and amorphous carbon, appropriately compressed and baked.

In order to restrain the shoes 22 against rotation, interlocking parts are provided between the base 19 and each of the shoes 22.

Each of these shoes is of general arcuate form, three being shown in this instance. The outer and inner edges 28 and 29 are substantially cylindrical and concentric. Each shoe also has radial end edges 30 and 27. Opening into the end edge 30 is a short arcuate slot 31 dividing this end edge into an inner and an outer portion. The outer portion is extended downwardly to form the projection 26. When the shoe 22 is made as a stamping, this slot makes it possible to bend the outer portion of edge 30 to form the projection 26. This projection is adapted to enter into the slots 31 formed in the periphery of the base 19, there being substantial clearance between these projections 26 and the slots 31.

Similarly, each of the end edges 27 is divided into an inner and outer portion by the aid of an arcuate slot 32. The inner portion of the end edge 26 has a downwardly turned projection 33 adapted to enter into the slots 34 formed in the inner periphery 21 of the base 19.

The slots 31 and 32 thus facilitate the formation of the downwardly extending projections 26 and 33. Accordingly, these shoes may be formed as a stamping or they may be forged. Similarly the base 19 may also be formed as a stamping or as a forging.

The end edges 27 and 30, as heretofore stated, are radial to the axis around which the shoes 22 are arranged. The inner surfaces 45 and 46 of projections 26 and 33 (Fig. 3) are parallel to these radial edges. The corresponding slots 31 and 34 in base member 19 are therefore shaped to conform to these projections 26 and 33.

The shoes 22 are so arranged as to permit slight tilting, for permitting the entry of oil or other lubricant between the upper faces of the shoes and the lower surface of the bearing plate 23. For this purpose the base member 19 is provided with a plurality of struck-up dimples or projections 35 upon which the lower surfaces of the shoes 22 rest. As indicated in Fig. 5, a slight tilt allowance is provided in the direction of relative movement of the bearing plate 24, as the bearing plate 24 moves in a clockwise direction, as indicated by arrow 47 of Fig. 2, and arrow 36 of Fig. 5.

As indicated in arrow 36, the shoes 22 may tilt downwardly toward the right permitting a lubricant to enter for lubrication purposes. Accordingly, the dimples 35 are so arranged angularly as to be near the trailing edge 30 of the corresponding shoe 22.

By virtue of this construction the rotor 4 is adequately supported upon the shoes 22. Any minor misalignment of the shaft 5 can be taken up by the tilting of the base 19 with respect to the tapered surface 18 of bracket 16.

The inventor claims:

1. In a thrust bearing structure: a bearing plate having an axis of rotation; a plurality of shoe members angularly spaced about said axis and supporting the bearing plate; each of said shoe members having an arcuate form, defined by inner and outer edges and end edges; each of said shoe members having only one pair of depending projections located respectively at the end edges, and respectively adjacent the inner and outer edges; and a base plate member supporting the shoe members and having slots for accommodating said projections restraining relative rotation as well as relative radial movement between the base plate member and the shoe members; said plate member and each shoe member including means for permitting the shoe member to tilt.

2. In a thrust bearing structure: a bearing plate having an axis of rotation; a plurality of shoe members angularly spaced about said axis and supporting the bearing plate; each of said shoe members having an arcuate form, defined by inner and outer edges and end edges; each of said shoe members having only one pair of depending projections located respectively at the end edges, and respectively adjacent the inner and outer edges; and a base plate member supporting the shoe members and having slots for accommodating said projections restraining relative rotation as well as relative radial movement between the base plate member and the shoe members; said plate member and each shoe member including means for permitting the shoe member to tilt, comprising a dimple formed on one of the members, and located nearer one end edge of the shoe member than the other end edge thereof.

3. In a thrust bearing structure: a bearing plate having an axis of rotation; a plurality of shoe members angularly spaced about said axis and supporting the bearing plate; each of said shoe members having an arcuate form, defined by inner and outer edges and end edges; each of said shoe members having only one pair of depending projections located respectively at the end edges, and respectively adjacent the inner and outer edges; and a base plate member supporting the shoe members and having slots for accommodating said projections restraining relative rotation as well as relative radial movement between the base plate member and the shoe members; said plate member and each shoe member including means for permitting the shoe member to tilt, comprising a dimple formed on one of the members, and located nearer one end edge of the shoe member than the other end edge thereof, said dimple being located nearer the outer edge of the shoe member than the inner edge thereof.

References Cited in the file of this patent
UNITED STATES PATENTS

| | | |
|---|---|---|
| 1,441,614 | Wadsworth | Jan. 9, 1923 |
| 1,443,879 | Kingsbury | Jan. 30, 1923 |
| 1,734,273 | Schein | Nov. 5, 1929 |
| 2,602,713 | Hatcher | July 8, 1952 |